United States Patent
Giardiniere et al.

(10) Patent No.: US 9,016,076 B2
(45) Date of Patent: Apr. 28, 2015

(54) APPARATUS AND METHOD FOR CONTROLLING THE TEMPERATURE OF A CRYOGEN

(75) Inventors: Kevin John Giardiniere, Bethlehem, PA (US); John Lewis Green, Palmerton, PA (US); Ranajit Ghosh, Macungie, PA (US); Daniel James Gibson, Pen Argyl, PA (US); Zbigniew Zurecki, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1287 days.

(21) Appl. No.: 12/675,282

(22) PCT Filed: Aug. 27, 2008

(86) PCT No.: PCT/US2008/074506
§ 371 (c)(1),
(2), (4) Date: Jul. 23, 2010

(87) PCT Pub. No.: WO2009/032709
PCT Pub. Date: Mar. 12, 2009

(65) Prior Publication Data
US 2012/0216550 A1  Aug. 30, 2012

Related U.S. Application Data

(60) Provisional application No. 60/968,479, filed on Aug. 28, 2007.

(51) Int. Cl.
F25D 3/10 (2006.01)
G05D 23/19 (2006.01)
F25D 29/00 (2006.01)

(52) U.S. Cl.
CPC .......... *G05D 23/1919* (2013.01); *F25D 29/001* (2013.01)

(58) Field of Classification Search
CPC ............ F24F 1/01; F24F 1/02; F25D 29/001; F25D 29/005
USPC .................................... 62/52.1, 122, 49.1, 97
See application file for complete search history.

(56) References Cited

U.S. PATENT DOCUMENTS 2,986,891 A    6/1961   McMahon
3,110,156 A   11/1963   Niemann
(Continued)

FOREIGN PATENT DOCUMENTS

CN    200998731 Y    1/2008
DE    1995-3230 A1    5/2001
(Continued)

OTHER PUBLICATIONS

Brian M. Pikkula et al., "Cryogen Spray Cooling: Effects of Droplet Size and Spray Density on Heat Removal," Lasers in Surgery and Medicine, 28:103-112 (2001).
(Continued)

*Primary Examiner* — Ljiljana Ciric
*Assistant Examiner* — Alexis Cox
(74) *Attorney, Agent, or Firm* — Amy Carr-Trexler

(57) ABSTRACT

A fluid spray device system (1) that maintains a resultant fluid discharge, or a material onto which the resultant fluid is discharged, within a predetermined range of a set-point temperature by regulating the flow rate of a throttling gas using a proportional valve (22). The resultant fluid has throttling gas and cryogenic fluid components. Both the throttling gas and cryogenic fluid are preferably supplied from a single tank (11) and the cryogenic fluid supply is pressure-regulated and includes a triaxial delivery hose (33) having a return line with a back-pressure regulator (54).

8 Claims, 3 Drawing Sheets

(56) References Cited

U.S. PATENT DOCUMENTS

| | | | |
|---|---|---|---|
| 3,395,548 A | 8/1968 | Yearwood | |
| 3,830,078 A | 8/1974 | Read | |
| 3,986,341 A * | 10/1976 | DeHaan | 62/50.7 |
| 3,992,169 A * | 11/1976 | Loudon | 62/50.7 |
| 4,011,734 A | 3/1977 | Jones | |
| 4,252,844 A | 2/1981 | Nesgood et al. | |
| 4,295,339 A * | 10/1981 | Kuraoka et al. | 62/64 |
| 4,498,304 A | 2/1985 | Guilhem | |
| 4,749,337 A | 6/1988 | Dickinson et al. | |
| 4,753,093 A | 6/1988 | Siemon et al. | |
| 4,806,150 A | 2/1989 | Alvarez et al. | |
| 5,151,119 A * | 9/1992 | Clements et al. | 65/84 |
| 5,327,763 A | 7/1994 | Kramer et al. | |
| 5,344,478 A | 9/1994 | Zurecki et al. | |
| 5,730,806 A | 3/1998 | Caimi et al. | |
| 5,738,281 A | 4/1998 | Zurecki et al. | |
| 5,755,128 A | 5/1998 | Tippins et al. | |
| 5,799,523 A | 9/1998 | Seidel et al. | |
| 6,860,950 B2 | 3/2005 | Franz et al. | |
| 6,874,344 B1 | 4/2005 | Junius et al. | |
| 7,054,764 B2 | 5/2006 | Williams et al. | |
| 7,167,099 B2 | 1/2007 | Kadwell et al. | |
| 2002/0189413 A1 | 12/2002 | Zurecki et al. | |
| 2004/0001182 A1 | 1/2004 | Dyner | |
| 2004/0245373 A1 | 12/2004 | Behrens | |
| 2005/0011201 A1 | 1/2005 | Zurecki et al. | |
| 2006/0029742 A1 | 2/2006 | Cesak et al. | |
| 2006/0228465 A1 * | 10/2006 | Zurecki | 427/8 |
| 2008/0048047 A1 * | 2/2008 | Zurecki et al. | 239/8 |
| 2010/0193980 A1 * | 8/2010 | Ghosh et al. | 264/28 |
| 2012/0055173 A1 * | 3/2012 | Quintard et al. | 62/52.1 |
| 2013/0125568 A1 * | 5/2013 | Chalk et al. | 62/115 |

FOREIGN PATENT DOCUMENTS

| | | |
|---|---|---|
| EP | 0 136 921 A2 | 4/1985 |
| EP | 0249186 A1 | 12/1987 |
| FR | 1564042 A | 4/1969 |
| GB | 1418400 | 12/1975 |
| GB | 2294217 A | 4/1996 |
| JP | 05-050121 | 3/1993 |
| JP | 08117644 A | 5/1996 |
| JP | 2001-096301 | 4/2001 |
| JP | 2006337326 | 12/2006 |
| SU | 710705 | 1/1980 |
| WO | 97/19773 A1 | 6/1997 |
| WO | 2009032709 | 3/2009 |

OTHER PUBLICATIONS

International Search Report, mailed Jan. 2, 2009, completed by US ISA.

* cited by examiner ns of cryogenic gases. One volume of liquid nitrogen (LIN) transforms into 693 volumes of nitrogen gas (GAN) at room temperature. Large volumes of gas can impeded cryogenic liquid flow, particularly when the cryogenic fluid is transported over long distances, making temperature control extremely difficult. Pressure drops often occur during transport of liquid cryogens over long distances. With any sudden pressure drop, a portion of the cryogenic liquid is transformed into gas that causes fluctuations in the flow rate if not removed from the feed line. Also, due to the difficulty of using adjustable valves on a cryogenic fixture, providing real-time adjustment of the delivery pressure of cryogen coolants is problematic.

APPARATUS AND METHOD FOR CONTROLLING THE TEMPERATURE OF A CRYOGEN

CROSS REFERENCE TO RELATED APPLICATION

This application is the National Stage of International Application No. PCT/US08/74506, filed Aug. 27, 2008, which claims the benefit of U.S. Provisional Application No. 60/968,479, filed Aug. 28, 2007, which is incorporated herein by reference in its entirety as if fully set forth.

BACKGROUND

The present invention is directed to controlling temperature in a cryogenic cooling operation that disperses a cryogen flow, and in particular, it is directed to a dual phase cooling system that provides variable temperature control using a proportional mixture of cryogen liquid and gas, the gas fraction controlled by a proportional valve modulated in response to temperature feedback from the cryogen flow.

Controlled cooling is critical in various manufacturing and operating environments, for example, during machining and/or rolling a product, thermal spraying, de-molding, quenching, and other like operations. Precise temperature control of the dispersed cryogen coolant, and at times, temperature control along tool surfaces, is required in many machining and rolling operations. Using a cryogen coolant in such applications has limited applicability due to the likelihood of overcooling or undercooling of the target product surface for any of the following reasons: (a) the heat generated during machining or rolling is smaller or larger than the heat capacity of the delivered coolant, or (b) irreversible changes in the product bulk or surface properties occur at the extremely cold temperatures generated by cryogens. Wide temperature fluctuations are detrimental to materials that are susceptible to cold temperatures causing surface damage and/or material fractures in the product.

Past attempts to provide controlled cryogenic cooling temperature at the target surface or contiguous atmosphere involve varying cryogen flow rates so that more or less cryogen is delivered to the target surface. This is accomplished by using different nozzle orifice sizes, different size restrictions in the cryogen feed lines, or periodic cycling of a cryogenic solenoid that modulates the coolant flow rate. In such instances, the cryogen flow rate is matched with heat generated within the operating environment.

Varying cryogenic temperatures with heaters has also been used in the past to provide temperature control. However, such processes do not include temperature feedback and are not suited for variable thermal loads. The use of external heaters is difficult and cumbersome to implement, and their use provides inaccurate or approximate temperature control that results in wide temperature fluctuations. The use of internal heaters is also problematic, due to slow reaction time and the setup and control difficulties associated with a heater located in a bath of liquid cryogen and within a cryogenic fixture.

Attempts to adapt non-cryogenic temperature feedback systems for use with cryogenic coolants have been unsuccessful for several reasons. Precise temperature control of low boiling point cryogen coolants at subzero temperatures is extremely difficult due to significant heat loss to the environment. When cryogenic liquids are delivered at low flow rates, heat loss (or the heat sink effect) is extremely critical. In addition, cryogenic liquids constantly boil off into large vol- Related prior art includes U.S. Pat. Nos. 4,484,457, 4,848,093, 5,647,228 and 6,513,336.

SUMMARY OF THE INVENTION

In one respect, the invention comprises a fluid spray device comprising a gas supply assembly adapted to supply a throttling gas to a contact zone, a cryogenic fluid supply assembly adapted to supply a cryogenic fluid to the contact zone, a nozzle located downstream from the contact zone and being in fluid communication with the contact zone, the nozzle being adapted to receive a resultant fluid from the contact zone and discharge the resultant fluid, a sensor adapted to measure a first temperature, the first temperature being a temperature of the resultant fluid or a temperature of a material onto which the discharge of the resultant fluid is directed and a controller adapted to receive signals from the sensor. The controller is programmed to maintain the first temperature within a predetermined range of a set-point temperature by regulating a flow rate at which the throttling gas is supplied to the contact zone.

In another respect, the invention comprises a method comprising supplying a throttling gas a contact zone using a gas supply assembly, supplying a cryogenic fluid the contact zone using a cryogenic fluid assembly, discharging a resultant fluid from the contact zone through a nozzle, measuring a first temperature, the first temperature being a temperature of the resultant fluid or a temperature of a material onto which the resultant fluid is discharged, and maintaining the first temperature within a predetermined range of a set-point temperature by regulating a flow rate at which the throttling gas is supplied to the contact zone.

In yet another respect, the invention comprises a method comprising supplying a throttling gas a contact zone using a gas supply assembly, supplying a cryogenic fluid the contact zone using a cryogenic fluid assembly, discharging a resultant fluid from the contact zone through a nozzle, measuring a first temperature, the first temperature being a temperature of the resultant fluid or a temperature of a material onto which the resultant fluid is discharged, and maintaining the first temperature within a predetermined range of five degrees F. (2.7 degrees C.) above or below a set-point temperature.

DETAILED DESCRIPTION OF THE INVENTION

Figure 1:
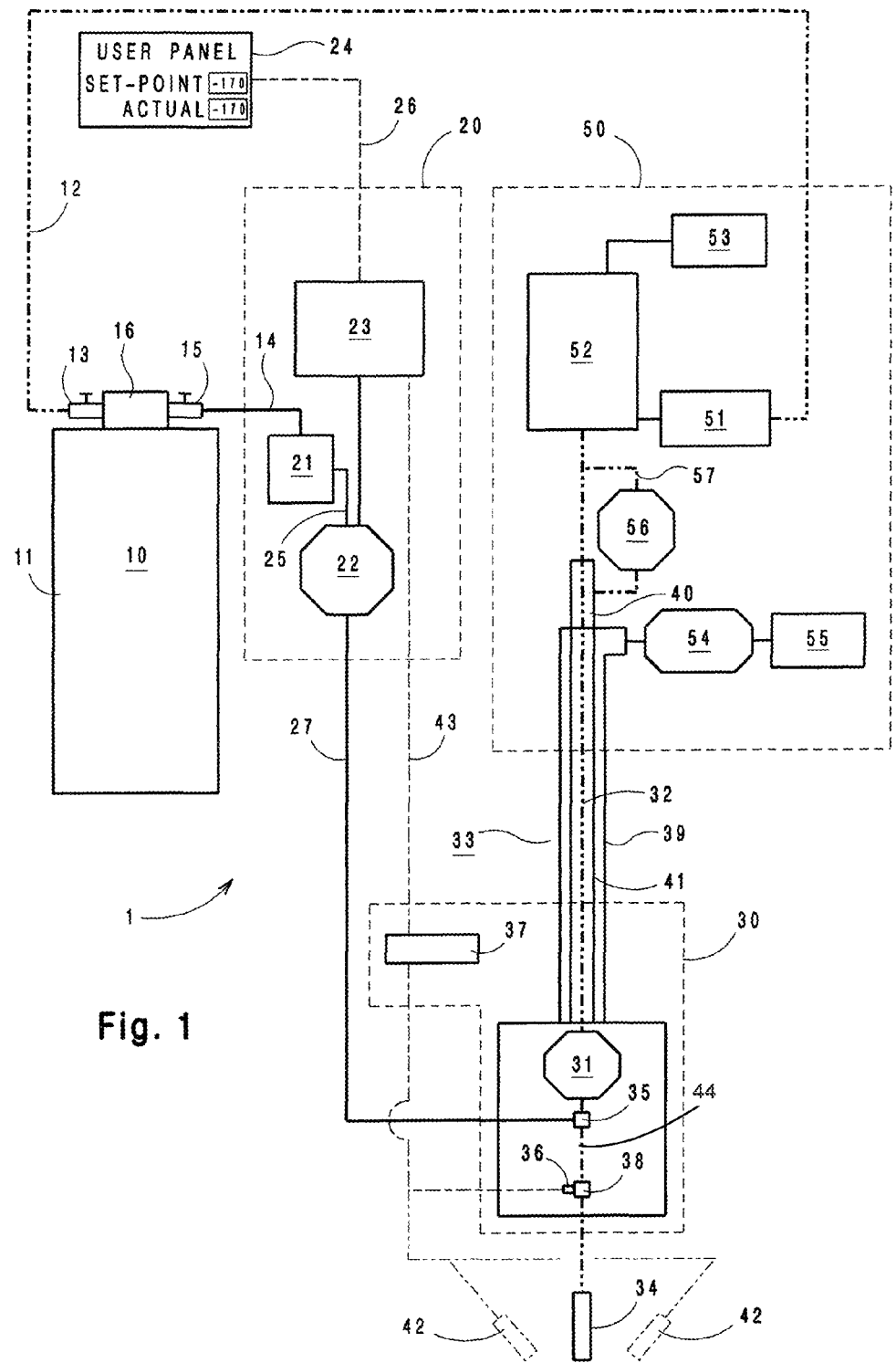
FIG. 1 is a schematic view of a single nozzle, variable temperature cryogen coolant delivery system.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features. In the drawings, cross-hatching in a sectional view indicates a microporous material and hatching in a sectional view indicates non-microporous material.

As used herein, the term "cryogenic fluid" is intended to mean a liquid, gas or mixed-phase fluid having a temperature less than −70 degrees. Examples of cryogenic fluids include liquid nitrogen (LIN), liquid oxygen (LOX), and liquid argon (LAR), liquid carbon dioxide and pressurized, mixed phase cryogens (e.g., a mixture of LIN and gaseous nitrogen).

As used herein, the term "cryogenic cooling device" is intended to mean any type of apparatus or device which is designed to discharge or spray a cryogenic fluid (either in liquid, mixed-phase, or gaseous form). Examples of cryogenic cooling devices include, but are not limited to, cryogenic spray bars, individual cryogenic spray nozzles, devices containing arrays of cryogenic spray nozzles.

As used herein, the term "nozzle" is intended to refer to one or more openings for discharging a fluid. Examples of nozzles include a single round opening, an array of openings, and an elongated slot.

Referring to FIG. 1, the present invention is directed to a cryogenic coolant delivery system 1 comprising a cryogen source 10, a throttling gas control and delivery assembly 20, a cryogenic fluid delivery assembly 50 and a coolant discharge assembly 30.

The cryogen source 10 comprises a tank or cylinder 11 containing a cryogenic fluid that is separated into a liquid and gas phase by a phase separator 16. A vaporizer (not shown) is preferably positioned around the interior perimeter of the tank 11 and feeds the gas phase to the phase separator 16. In this embodiment, the tank 11 provides a supply pressure of about 100 psig (7.0 kg/cm$^2$). The liquid phase is fed into a cryogenic fluid supply line 12, which is preferably controlled with an on/off valve 13. The gas phase (hereinafter referred to as "throttling gas") is fed into a throttling gas supply line 14, which also preferably includes an on/off valve 15. Valves 13, 15 are preferably opened prior to operation of the cryogenic coolant delivery system 1 and closed after operation of the cryogenic coolant delivery system 1 has concluded. In alternate embodiments, separate tanks could be provided to supply the throttling gas and cryogenic fluid.

In this embodiment, the cryogenic fluid is liquid nitrogen (LIN) and the throttling gas is gaseous nitrogen (GAN). However, any suitable throttling gas, for example helium, argon, oxygen, etc. may be used without departing from the scope of the present invention. The GAN is preferably supplied at a temperature equal to or slightly above ambient temperature, e.g., about 60° F. (16° C.), and is preferably supplied at a higher pressure than the pressure at which the cryogenic fluid is supplied. In addition, it is preferable that the throttling gas have a boiling point that is no higher than the boiling point of the cryogenic fluid.

The throttling gas flows through the throttling gas supply line 14, into a pressure regulator 21, through a proportional valve 22, through a distribution line 27 and into a contact zone 35. The proportional valve 22 is preferably controlled by a programmable logic controller (PLC) 23. The PLC is preferably adapted to communicate with a user panel 24 via line 26. As will be described in greater detail herein, the PLC 23 can adjust the proportional valve 22 for the purpose of increasing or decreasing the flow rate of the throttling gas in the distribution line 27. In the embodiments, other types of proportional fluid control devices could be substituted for the proportional valve 22.

The proportional valve 22 is described herein as being used to regulate the flow rate at which throttling gas is supplied to a cryogenic cooling device (including device 14). As used herein, the term "flow rate" should be understood to mean a volumetric flow rate. It should further be understood that, the proportional valve 22 is adjusted by increasing or decreasing the size of the opening through which the throttling gas flows, which causes a corresponding increase or decrease, respectively, in the flow rate of throttling gas through the opening. Increasing the size of the opening also decreases the pressure drop across the proportional valve, and therefore, increases the pressure of the throttling gas downstream of the proportional valve. Conversely, decreasing the size of the opening increases the pressure drop across the proportional valve, and therefore, decreases the downstream pressure of the throttling gas. Therefore, due to the direct proportional relationship between flow rate and downstream pressure of the throttling gas, adjusting the proportional valve 22 regulates both the flow rate and the pressure at which the throttling gas is provided to the cryogenic cooling device. In addition, due to this direct proportional relationship, the supply characteristics of the throttling gas and cryogenic fluid may be described herein in terms of either their respective flow rates or their respective pressures.

The cryogenic fluid flows through the cryogenic fluid supply line 12, through a pressure regulator 51 which, in this embodiment, maintains the cryogenic fluid at an operating pressure in the range of 60-120 psig (4.2-8.4 kg/cm$^2$) and, preferably, at around 80 psig (5.6 kg/cm$^2$). All pressure values provided in this application should be understood as referring to relative or "gauge" pressure. The preferred operating pressure range for the cryogenic fluid may be different in other embodiments. A phase separator 52, located downstream from the pressure regulator 51, separates the gas-phase portion of the cryogenic fluid and vents it to atmosphere via a vent 53.

The cryogenic fluid flows from the phase separator 52 through an inner line 32 and into the coolant discharge assembly 30, where it intersects the contact zone 35. A solenoid valve 31 may be included to enable the flow of cryogenic fluid into the contact zone 35 to be turned on or off just upstream from the contact zone 35. The inner line 32 is preferably part of a triaxial delivery hose 33 which is designed to maintain the of the cryogenic fluid and to reduce the gas-to-liquid ratio of the cryogenic fluid as it flows through the inner line 32 and is ultimately supplied to the contact zone 35. The triaxial delivery hose 33 includes a return line 39, an outer line 41 located within the return line 39, and the inner line 32, which is located within the outer line 41. All three lines 32, 41, 39 are preferably coaxial.

A supply line 57 allows a relatively small portion of the cryogenic fluid to flow into an annular space located between the inner and outer lines 32, 41. A metering valve 56 is preferably provided to enable the flow of cryogenic fluid to the annular space to be controlled. The portion of the cryogenic fluid diverted into the annular space 40 immediately vaporizes and is maintained at a lower pressure than the pressure of the cryogenic fluid flowing through the inner line 32, which results in a lower temperature within the annular space 40. This enables the outer line 41 to provide refrigeration to the inner line 32.

The outer line 41 preferably vents gas to the return line 39, which enables the relatively low pressure (and therefore low temperature) to be maintained in the outer line 41. The venting of gas from the outer line 41 to the return line 39 can be accomplished using any suitable means, such as a vent, small holes, or by forming the outer line 41 from a gas-permeable material, for example. The return line 39 vents the gas to atmosphere using a vent 55. The return line 39 also preferably includes a back-pressure regulator 54 which, in this embodiment, maintains a pressure in the return line 39 in the range of about 2 to about 15 psig (0.1 to 1.1 kg/cm$^2$), with a preferred back pressure range of about 6 psig to about 8 psig (0.4 to 0.6 kg/cm$^2$).

The contact zone 35 (also referred to as a "mixing zone") is an area in which the flow of throttling gas intersects the flow of the cryogenic fluid. The function of the contact zone 35 is to enable use of the throttling gas (supplied through distribution line 27) to control the rate at which cryogenic fluid is discharged from the nozzle 34. The "throttling gas" concept is disclosed and discussed in detail in U.S. patent application Ser. No. 11/846,116, filed Aug. 28, 2007, which is incorporated herein by reference as if fully set forth. U.S. patent application Ser. No. 11/846,116 provides several examples of possible contact zone configurations. In its simplest form, the contact zone 35 could consist of joint at which the distribution line 27 for the throttling gas intersects the inner line 32 in a non-parallel angle, preferably between 10 and 90 degrees. In the embodiment shown in FIG. 1, the throttling gas distribution line 27 intersects the contact zone 35 at a about a 30-degree angle relative to the inner line 32.

After intersecting at the contact zone, the throttling gas and the cryogenic fluid form a resultant fluid, which flows through a resultant fluid line 44 and is discharged through a nozzle 34. The composition of the resultant fluid will depend upon several factors, including, but not limited to, the temperatures and pressures (which, as explained above, are related to flow rates) at which the throttling gas and cryogenic fluid are supplied to the contact zone 35. For example, if the throttling gas is supplied to the contact zone 35 at pressure that is equal to or lower than the pressure of the cryogenic fluid, the resultant fluid will, under most operating conditions, consist almost entirely of cryogenic fluid. As the pressure of the throttling gas is increased (relative to the pressure of the cryogenic fluid), the throttling gas will begin to "throttle" the cryogenic fluid, and therefore, will result in a corresponding increase in the ratio of throttling gas to cryogenic fluid in the resultant fluid. The temperature of the resultant fluid depends, in large part, on proportion of cryogenic fluid in the resultant fluid. Therefore, the temperature of the resultant fluid is also a function of the flow rate (which, as explained above, is related to the pressure) at which the throttling gas is supplied to the contact zone 35.

As noted above, the throttling gas is preferably provided to the contact zone 35 at a higher pressure than the cryogenic fluid. In this embodiment, a pressure differential between the throttling gas and the cryogenic fluid is preferably within the range of about 5.0 psig to about 50.0 psig (0.4 to 3.5 kg/cm$^2$) and, more preferably, with the range of between about 10.0 psig to about 25.0 psig (0.7 to 1.8 kg/cm$^2$). In this embodiment, a pressure differential of at least 5 psig (0.4 kg/cm$^2$) is preferred, in order to prevent the cryogenic fluid from flowing in to the throttling gas distribution line 27. In this embodiment, a pressure differential of about 20 psig (1.4 kg/cm$^2$) is required for the throttling gas to choke off the flow of cryogenic fluid (i.e., the resultant fluid contains very little, if any, cryogenic fluid).

It is preferable that the throttling gas control and delivery assembly 20 and the cryogenic fluid delivery assembly 50 be configured so that throttling gas can be supplied at a pressure that is sufficient to choke off the flow of cryogenic fluid at the contact zone 35, which is about 20 psig (1.4 kg/cm$^2$) in this embodiment. If, as in this embodiment, a single tank 11 is used to supply both the throttling gas and the cryogenic fluid, it will be necessary to either boost the supply pressure of the throttling gas or reduce the supply pressure of the cryogenic fluid (as in this embodiment). In most applications, it will be more efficient to reduce the supply pressure of the cryogenic fluid.

In this embodiment, a temperature probe 36 is positioned in the resultant fluid line 44 at connection 38, which is located between the contact zone 35 and the nozzle 34. The probe 36 is part of a thermocouple 37, which is configured to transmit continuous real time temperature measurements to the PLC 23. It should be understood that other temperature monitoring methods may be used in other embodiments without departing from the scope of the present invention. For example, optional temperature sensors 42 such as diodes, resistance temperature detectors, and capacitance sensor thermometers, for example, may be used to monitor the target surface or contiguous atmosphere. In such an instance, the optional temperature sensors 42 would transmit a stream of data to the PLC 23, as described in this embodiment.

Operation of the variable temperature cryogenic coolant delivery system 1 begins by determining a target or set point temperature for a particular cryogenic cooling operation. In this embodiment, the desired set-point temperature is entered into the user panel 24 by an operator and the set-point temperature is communicated to the PLC 23 via line 26. In this embodiment, the set-point temperature can range from between about −455 degrees F. to about 60 degrees F. (−271 degrees C. to 15 degrees C.). In alternate embodiments, the set-point temperature could be fixed or non-user adjustable. In such embodiments, the set-point temperature could simply be part of the programming of the PLC 23.

During operation of the cryogenic coolant delivery system 1, if the temperature of the resultant fluid, as measured by the thermocouple 37, deviates from the set-point, the PLC 23 is programmed to adjust the proportional valve 22 to adjust the proportional valve 22 in order to bring the temperature of the resultant fluid back to the set-point temperature. Given that the composition, and therefore temperature, of the resultant fluid is dependent, at least in part, on the pressure differential between the throttling gas and the cryogenic fluid at the contact zone 35, it is preferable that the flow rate (and pressure) at which the cryogenic fluid is supplied to the contact zone 35 be as constant as possible.

It should be noted that if the measured temperature is that of the resultant fluid (i.e., the temperature probe 36 is located in the discharge stream of the resultant fluid), the presence of cryogenic liquid droplets in the resultant fluid at the location of measurement can result in inaccurate temperature readings because the temperature of each cryogenic liquid droplet will be much colder than the overall (average) temperature of the resultant fluid. Accordingly, if cryogenic liquid droplets are expected to be present in the resultant fluid, it is preferable to provide sufficient distance between the contact zone and the temperature probe 36 to enable any cryogenic liquid droplets to vaporize before reaching the temperature probe 36. In applications in which it is desirable for the resultant fluid to include a substantial cryogenic liquid component when it contacts the material being cooled, it will be preferable to measure the temperature of a portion of the material instead of the temperature of the resultant fluid itself.

Figure 2:
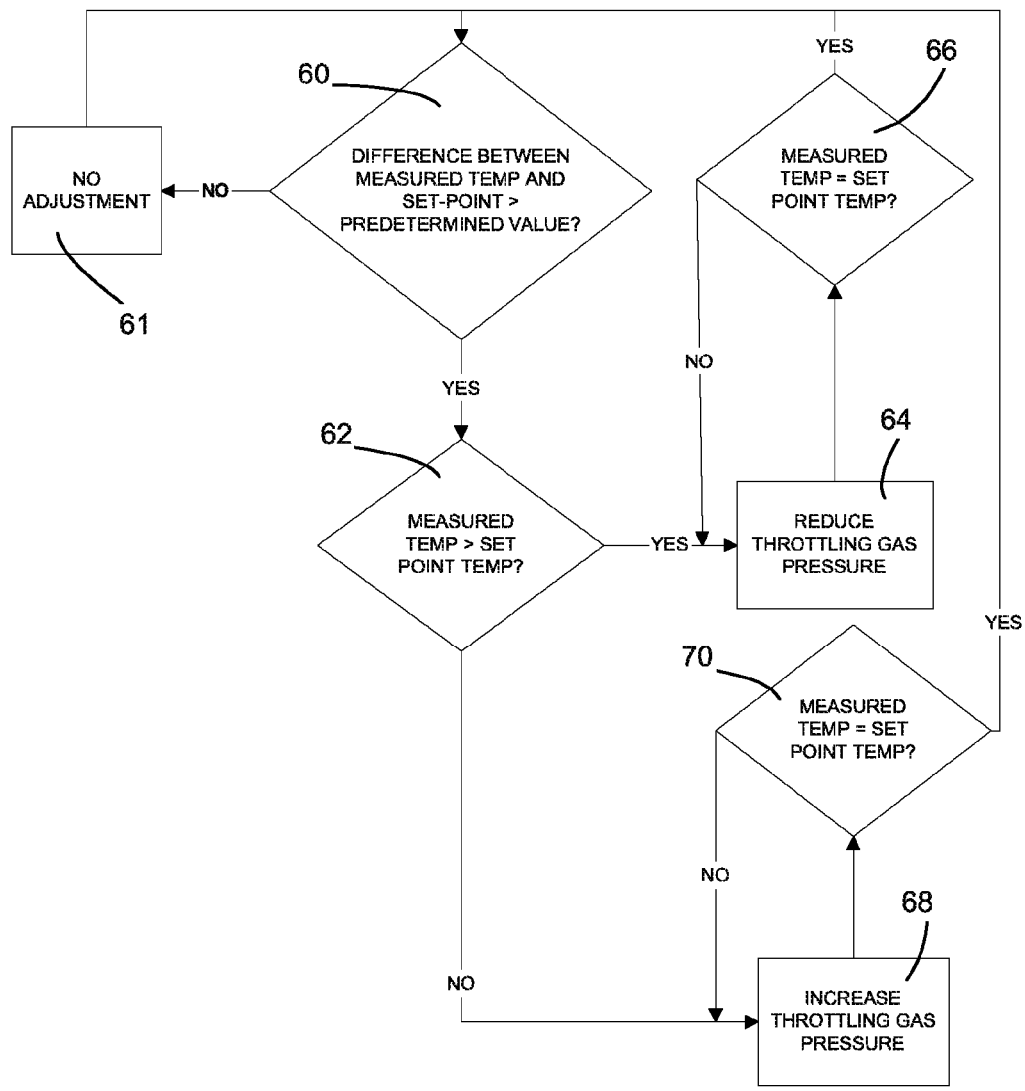
FIG. 2 is a flow chart showing one embodiment of an algorithm used to control the resultant fluid temperature for the delivery system of FIG. 1.

A flow chart showing an example of an algorithm used by the PLC 23 to control resultant fluid temperature is shown in FIG. 2. When the PLC 23 receives a temperature reading from the thermocouple 37, it determines the difference between the measured temperature and the set-point temperature and compares the difference to the predetermined range (see step 60). If the difference is not greater than the predetermined range, no adjustment of the proportional valve 22 is made by the PLC 23 (see step 61). If the difference is greater than the predetermined range, the PLC 23 determines if the measured temperature is greater than the set-point temperature (see step 62). If so, the PLC 23 adjusts the proportional valve 22 to increase the flow rate of the throttling gas (see step 64) until the measured temperature of the resultant fluid rises to the set-point temperature (see step 66). If not, the PLC 23 adjusts the proportional valve 22 to decrease the flow rate of the throttling gas (see step 64) until the measured temperature of the resultant fluid drops to the set-point temperature.

The PLC 23 could also be programmed to provide a delay (for example, two seconds) between adjustments of the proportional valve 22. This delay feature could be used as an alternative to step 62 of FIG. 2 (i.e., every two seconds, the PLC 23 adjusts the proportional valve 22 if there is any difference between the measured temperature and the set-point temperature) or in combination with step 62 (i.e., the PLC 23 measures the difference between the measured temperature every two seconds and adjusts the proportional valve 22 only if the difference is greater than or equal to the predetermined range.

If it is desirable to maintain a set-temperature within an acceptable temperature range (a first predetermined range), it is preferable that the predetermined range of step 62 (a second predetermined range) be no greater than the acceptable temperature range and, more preferably, less than the acceptable temperature range. For example, if an application requires that the temperature measured by the thermocouple 37 be within five degrees F. (2.7 degrees C.) of the set-point temperature, a predetermined range of two degrees F. (1.1 degrees C.) could be used.

Due the difficulty of adjusting the flow rate of the cryogenic fluid during operation of the cryogenic coolant delivery system 1, it is preferable that the flow rate at which the cryogenic fluid is supplied to the contact zone 35 not be adjusted by the PLC 23 for the purpose of maintaining the set-point temperature. Although such adjustment would not be inconsistent with the principles of the present invention, it is not practical under the current state of the art.

Figure 3:
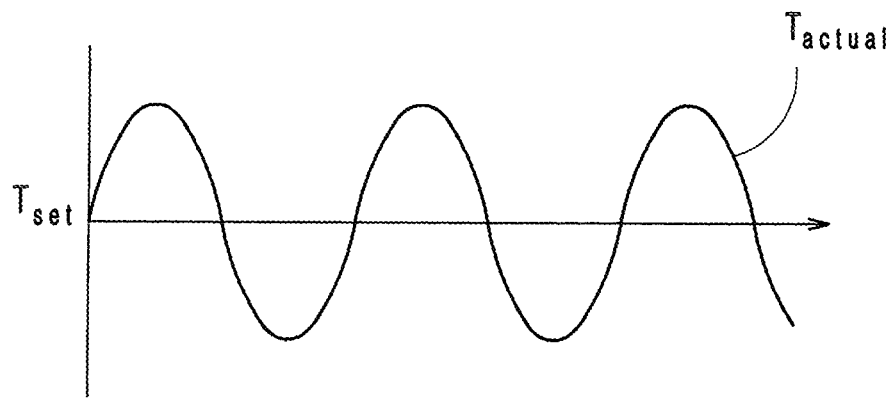
FIG. 3 is a graph showing cryogen coolant temperature and flow rate fluctuations using throttling gas to control coolant temperature.
Figure 4:
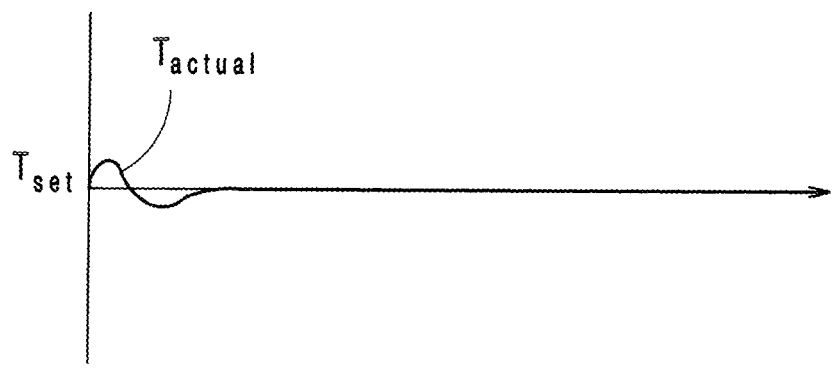
FIG. 4 is a graph showing the cryogen temperature and flow rate using the proportional and temperature set-point feedback system of the present invention.

Use of a proportional valve 22 to control throttling gas flow rate provides significantly improved temperature characteristics for the cryogenic coolant delivery system 1. FIG. 3 is a graph showing the relatively large fluctuations of the measured temperature of the resultant fluid ("Tactual") above and below the set-point temperature ("Tset") for a cryogenic coolant delivery system using a non-proportional valve (on/off only). FIG. 4 is graph showing the same information as FIG. 3, but using a prototype of the cryogenic coolant delivery system 1 of the present invention, which includes a proportional valve 22 for controlling throttling gas flow rate. As shown in FIG. 4, the cryogenic coolant delivery system 1 provided much smaller fluctuations in resultant fluid temperature. Based on tests of a prototype of cryogenic coolant delivery system 1, the temperature of the resultant fluid can be kept within five degrees F. (2.7 degrees C.) of (i.e., no more than five degrees F./2.7 degrees C. above or below) the set-point temperature.

It should be understood that many variations of the invention could be provided in alternate embodiments. For example, multiple nozzles could be provided, with either a single thermocouple or a thermocouple located on each nozzle.

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:
1. A method comprising:
supplying a throttling gas to a contact zone using a gas supply assembly;
supplying a cryogenic fluid to the contact zone using a cryogenic fluid assembly;
discharging a resultant fluid from the contact zone through a nozzle;
measuring a first temperature, the first temperature being a temperature of the resultant fluid or a temperature of a material onto which the resultant fluid is discharged; and
maintaining the first temperature within a first predetermined range of a set-point temperature by regulating a flow rate at which the throttling gas is supplied to the contact zone,
wherein the supplying a cryogenic fluid step comprises supplying the cryogenic fluid to the contact zone using a supply line having a return line, an outer line located within the return line and an inner line located within the outer line, wherein the inner line is adapted to supply the cryogenic fluid to the contact zone, and wherein the return line, the outer line, and the inner line are all coaxial.

2. The method of claim 1, wherein the maintaining step comprises maintaining the first temperature within the first predetermined range of the set-point temperature by adjusting a proportional fluid control located on the gas supply assembly.

3. The method of claim 2, wherein the maintaining step comprises increasing the flow rate at which the throttling gas is supplied to the contact zone if the first temperature rises above the set-point temperature and outside of a second predetermined range and decreasing the flow rate at which the throttling gas is supplied to the contact zone if the first temperature drops below the set-point temperature and outside of the second predetermined range.

4. The method of claim 1, wherein the maintaining step further comprises maintaining the first temperature within the first predetermined range without adjusting the volumetric flow rate at which the cryogenic fluid is supplied to the contact zone.

5. The method of claim 1, wherein the maintaining step further comprises maintaining the first temperature within the predetermined range of no more than five degrees F. (2.7 degrees C.) above or below the set-point temperature.

6. The method of claim 1, wherein the supplying a throttling gas step comprises supplying a throttling gas to the contact zone at a first pressure that is greater than a second pressure at which the cryogenic fluid is supplied to the contact zone.

7. The method of claim 6, wherein the supplying a throttling gas step comprises supplying a throttling gas to the contact zone at a first pressure that is between 5 and 50 psig (0.4-3.5 kg/cm$^2$) greater than a second pressure at which the cryogenic fluid is supplied to the contact zone.

8. The method of claim 1, wherein the measuring step comprises measuring a first temperature, the first temperature being a temperature of the resultant fluid before the resultant fluid is discharged from the nozzle.

* * * * *